(12) United States Patent
Lavezzi

(10) Patent No.: US 7,100,751 B2
(45) Date of Patent: Sep. 5, 2006

(54) HYDRAULIC PUMP FOR VEHICLES CONTROLLABLE BY HANDLEBARS

(75) Inventor: Roberto Lavezzi, Brembate di Sopra (IT)

(73) Assignee: Freni Brembo S.P.A., Curno Bergamo (IT)

( * ) Notice: Subject to any disclaimer, the term of this patent is extended or adjusted under 35 U.S.C. 154(b) by 0 days.

(21) Appl. No.: 10/432,955

(22) PCT Filed: Nov. 30, 2000

(86) PCT No.: PCT/IT00/00494

§ 371 (c)(1),
(2), (4) Date: Aug. 8, 2003

(87) PCT Pub. No.: WO02/44009

PCT Pub. Date: Jun. 6, 2002

(65) Prior Publication Data
US 2004/0045775 A1    Mar. 11, 2004

(51) Int. Cl.
*B60T 11/00* (2006.01)

(52) U.S. Cl. ............... 188/344; 188/24.14; 188/24.22; 60/594; 74/489; 74/502.2; 74/471 XY; 74/479.01

(58) Field of Classification Search ............... 188/344, 188/24.11, 24.12, 24.14, 24.16, 24.22, 355, 188/358, 359; 60/593, 594, 584; 74/489, 74/491, 502.2, 551.8, 488, 471 XY, 479.01; 192/85 R
See application file for complete search history.

(56) References Cited

U.S. PATENT DOCUMENTS

| | | | | |
|---|---|---|---|---|
| 4,456,310 A | * | 6/1984 | Hayashi et al. ............... 303/10 |
| 4,501,340 A | * | 2/1985 | Yoshida ....................... 180/219 |
| 4,560,049 A | * | 12/1985 | Uchibaba et al. ........... 192/85 R |
| 4,635,442 A | * | 1/1987 | Bass ............................ 60/594 |
| 4,840,082 A | * | 6/1989 | Terashima et al. ............ 74/523 |
| 4,896,753 A | * | 1/1990 | Sule ............................ 188/344 |
| 5,050,381 A | * | 9/1991 | Matsuno et al. ............... 60/584 |
| 5,538,270 A |   | 7/1996 | Gajek et al. |
| 5,636,518 A | * | 6/1997 | Burgoyne et al. ............. 60/594 |
| 6,336,327 B1 | * | 1/2002 | Noro et al. ................... 60/533 |
| 6,457,378 B1 | * | 10/2002 | Hatakoshi et al. ............ 74/525 |

FOREIGN PATENT DOCUMENTS

| EP | 0 893 337 A2 | 1/1999 |
|---|---|---|
| EP | 0 893 337 A3 | 7/2000 |
| GB | 1 590 861 A | 6/1981 |
| JP | 10 250666 | 9/1998 |

OTHER PUBLICATIONS

International Search Report dated Aug. 29, 2001 for PCT/IT00/00494.

* cited by examiner

*Primary Examiner*—James McClellan
*Assistant Examiner*—Mariano Sy
(74) *Attorney, Agent, or Firm*—Hogan & Hartson LLP

(57) ABSTRACT

A master cylinder which has an unusual ability to limit space requirements, to be fitted in vehicles controllable by handlebars, comprises a cylinder body provided with a seat for housing a portion of the handlebar. A chamber for slidably housing a piston extends along an axis inside the cylinder body. A manual control lever which acts on the piston is mounted on the cylinder body for pivoting about its fulcrum in a plane. The axis along which the chamber for slidably housing the piston extends intersects the plane of pivoting of the control lever at a point.

24 Claims, 3 Drawing Sheets

HYDRAULIC PUMP FOR VEHICLES CONTROLLABLE BY HANDLEBARS

FIELD OF THE INVENTION

The subject of the present invention is a master cylinder for vehicles controllable by means of handlebars, comprising a cylinder body having a seat for housing a portion of the handlebar, a chamber for slidably housing a piston, the chamber extending along an axis inside the cylinder body, and a manual control lever which acts on the piston and is intended to pivot about its fulcrum in a plane.

BACKGROUND OF THE INVENTION

More particularly, the invention relates to a master cylinder for motor-vehicle brakes or clutches. In fact, as is known, in motor vehicles such as, for example, motorcycles, the brake generally associated with the front wheel is operated by means of a master cylinder mounted on the handlebars in the vicinity of one of the hand grips, conventionally the right-hand hand grip of the motorcycle.

Similarly, the clutch can also be operated by means of a master cylinder mounted on the handlebars on the opposite side to the brake master cylinder, that is, on the left-hand side of the motorcycle.

A master cylinder of the type described above is generally constituted by a cylinder body in which a chamber is formed for housing a piston. When the piston is operated by the driver, it acts on a working fluid contained in the respective brake or clutch system.

The chamber is arranged in communication with a reservoir which holds the working fluid and may be formed integrally with the cylinder body or may be separate and connected thereto by an external pipe.

A master cylinder of the above-mentioned type also has a control lever which is mounted for pivoting on the cylinder body and is intended to act on the piston. This control lever faces the respective hand grip of the handlebar on which the master cylinder is mounted and is operated by the driver by being pivoted about its fulcrum. In known master cylinders, as the control lever pivots about its fulcrum, it defines a plane which generally includes the axis along which an end portion of the handlebar extends, in the region of the hand grip to be gripped by the driver. The axis along which the chamber housing the piston extends and which is also defined as the axis of the master cylinder, also lies in the said plane, or in a plane parallel thereto.

In order to make the gripping of the control lever ergonomic for the driver, this plane, which contains both the axis of the end portion of the handlebar and the axis of the cylinder, is inclined to a horizontal plane, for example, defined by the plane in which the free surface of the working fluid is disposed inside the reservoir. The extent of this inclination is about 15° downwards in the direction of travel of the vehicle, this statement meaning that a point in the plane in the vicinity of the control lever is disposed below a point in the plane in the vicinity of the end portion of the handlebar, as described more specifically below.

In the field of motor vehicles, and motorcycles in particular, there is a particular need to have an especially compact and aesthetically pleasing external design which at the same time satisfies functional needs, for example, connected with aerodynamic requirements.

From this point of view, the above-mentioned master cylinders have many disadvantages. For example, both technical and aesthetic disadvantages connected mainly with problems of space requirements are encountered in mounting these cylinders on a motor vehicle. Motor vehicles in fact have bodywork elements such as hoods, windscreens, hand guards, fairings or other components which extend up to the vicinity of the ends of the handlebars where the hand grips, the master cylinders, and generally their respective reservoirs, are positioned. In particular, in the case of cylinders in which the cylinder body and the reservoir are formed integrally, the reservoir is generally positioned above the chamber housing the piston and may even reach considerable dimensions when the master cylinder is of a size suitable for operating, for example, two brake calipers.

Since the bodywork elements have to be designed to envelop the handlebars completely, housing both the master cylinders and the reservoirs, ugly protuberances are inserted in the vicinity of the latter and, as well as affecting the appearance of the bodywork, these also affect its functional and aerodynamic aspects.

The problem upon which the present invention is based is that of proposing a master cylinder for vehicles controlled by means of handlebars which has structural and functional characteristics such as to satisfy the above-mentioned requirements and, at the same time, to overcome the disadvantages mentioned with reference to the prior art.

SUMMARY OF THE INVENTION

This problem is solved by a master cylinder for vehicles controllable by means of handlebars according to Claim 1.

BRIEF DESCRIPTION OF THE DRAWINGS

Further characteristics and the advantages of the master cylinder according to the invention will become clear from the following description of a preferred embodiment thereof, provided by way of non-limiting example with reference to the appended drawings, in which.

DETAILED DESCRIPTION OF THE INVENTION

With reference to the drawings, a master cylinder, generally indicated 1, comprises a cylinder body 2.

Figure 1:
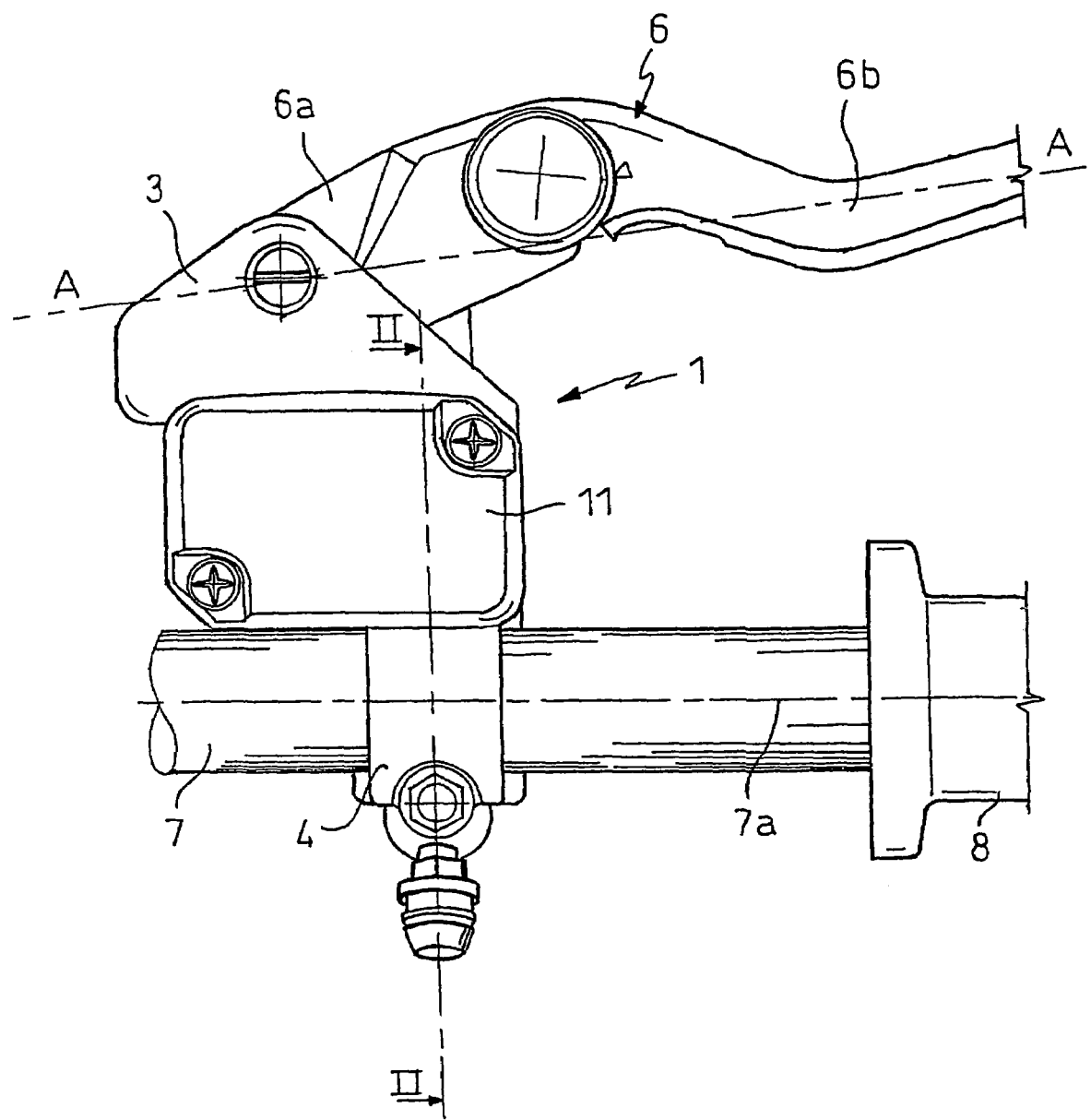
FIG. 1 shows, from above, a handlebar portion on which a master cylinder according to the present invention is fitted.
Figure 2:
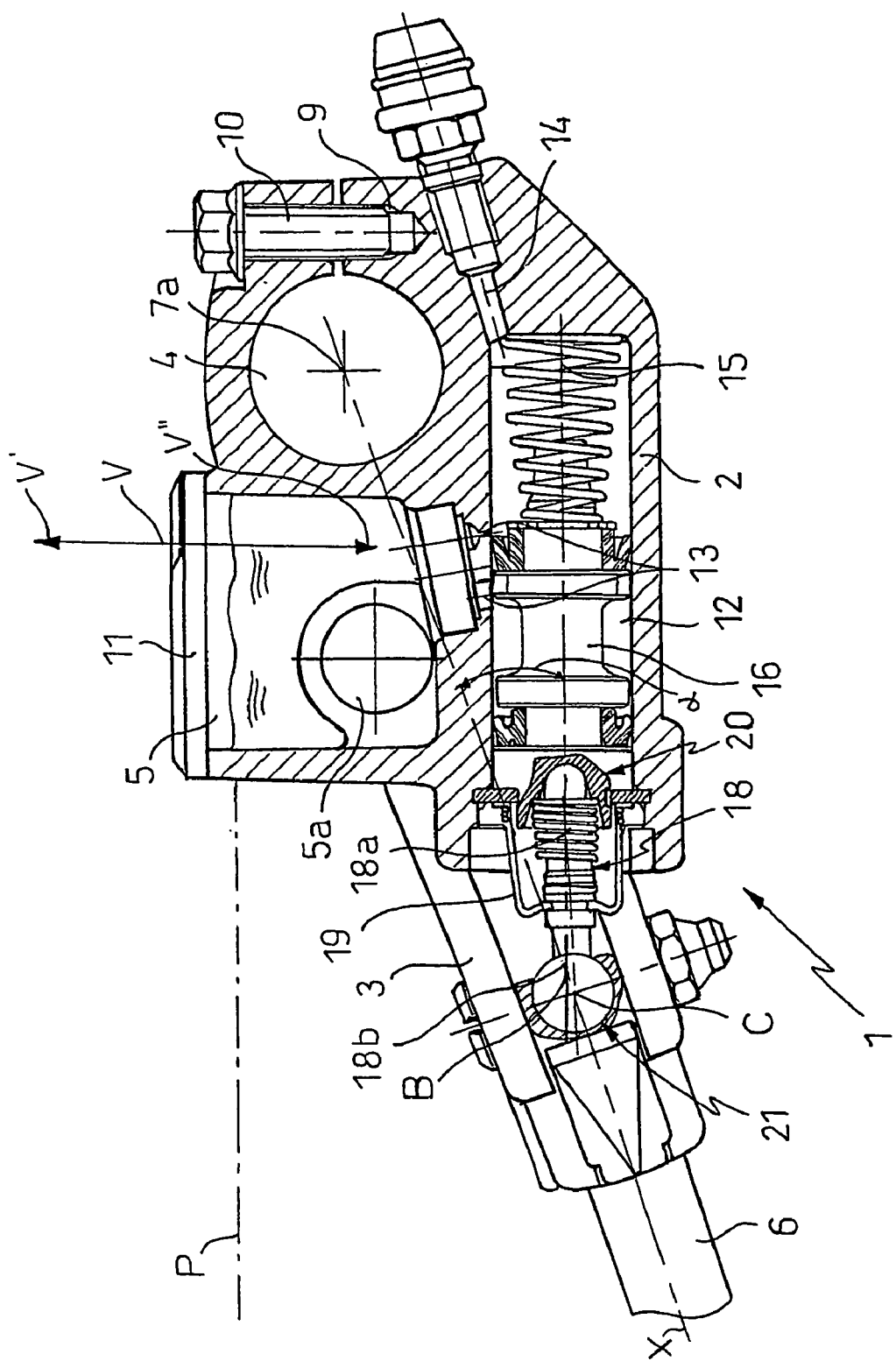
FIG. 2 is a partially-sectioned view of the cylinder of FIG. 1, taken in the plane of the line II—II.

In the embodiment illustrated in FIGS. 1 and 2, the cylinder body 2 is formed as a unitary element extended by a yoke 3, a handlebar seat 4, and a reservoir 5.

A possible datum relating to the master cylinder 1 is obtained by a vertical axis V and a horizontal plane P, defined as stated below.

The reservoir 5 in fact contains a working fluid, this definition meaning a fluid of any type suitable for use in braking systems or clutch systems, for example, for applications in vehicles controllable by means of handlebars. This fluid is disposed in the reservoir 5, defining a free surface which, since it is subject to the effect of gravity, is disposed in a horizontal plane P, the line of which is indicated in FIG. 2.

To prevent leakage of fluid from the reservoir and to utilize its maximum capacity, the reservoir is mounted on a motor-vehicle handlebar so as to have its walls substantially perpendicular to the horizontal plane P defined by the free surface of the fluid. When the fluid is held in the reservoir in working conditions, a vertical axis V, perpendicular to the plane P, is thus defined.

A first, upwardly-directed vector V' is defined along this vertical axis V, this definition meaning a vector directed away from the free surface of the fluid, generally towards the opening of the reservoir. Similarly, a second, downward vector V" is defined along the vertical axis V, this definition meaning a vector directed from the free surface of the fluid, into the fluid, generally towards the bottom of the reservoir.

Relative to a horizontal reference plane, for example, the plane P corresponding to the free surface of the working fluid in the reservoir, the first vector V' consequently defines an upper half-space and the second vector V" defines a lower half-space.

A control lever 6 is mounted for pivoting in the yoke 3 so as to face an end portion of a handlebar 7 of the motor vehicle and, in particular, a hand grip 8 to be gripped by the driver. The shape and mounting of the control lever 6, which are dictated by ergonomic considerations, are substantially conventional and the lever ratio remains unchanged from that of known master cylinders. In particular, the control lever 6 comprises a head 6a mounted for pivoting in the yoke 3. A slender portion 6b extending from the head is intended to be gripped by the driver whilst he is gripping the corresponding hand grip 8. The slender portion 6b has a curved shape designed to favour ergonomic gripping. The control lever 6 can pivot about its fulcrum towards the corresponding hand grip 8 as a result of the force exerted by the driver. When the driver releases the control lever 6 it can pivot away from the respective hand grip 8 and return to the initial rest position. As the control lever 6 pivots about its fulcrum it defines a plane X the line of which is shown in FIG. 2. This plane is, for example, defined by the rotation of an axis A—A extending through the fulcrum of the control lever 6 and interpolating the shape of the slender portion 6b.

In greater detail, with reference to the end portion of the handlebar 7 which is gripped by the driver, this portion extends along an axis 7a which, for reasons of ergonomics, preferably lies in the plane X of pivoting of the control lever 6. In the embodiment shown in the drawings, the axis 7a of the end portion of the handlebar 7 coincides with the axis of the continuation of the handlebar on which the master cylinder 1 is mounted and, in the mounted condition, thus coincides with the axis of the seat 4 of the master cylinder 1.

Moreover, to facilitate gripping of the control lever 6 by the driver and to enable the driver to adopt the correct position on the motor vehicle, the plane X is inclined downwards in the direction of travel of the vehicle, at about 15° to a horizontal plane. That is, with reference to the horizontal plane parallel to the plane P and extending through the fulcrum of the control lever 6, the axis 7a is disposed in the upper half-space relative to that plane, in the upward direction indicated by the first vector V' of the axis V, as defined above.

The seat 4 is shaped so as to surround a portion of the handlebar 7. In the embodiment in question, the seat 4 is cylindrical in order to surround the tubular structure of the handlebar 7 and extends along an axis which, in the mounted condition, coincides with the axis of the handlebar. As already stated above, in the embodiment illustrated in the drawings, the axis of the seat 4 coincides with the axis 7a of the portion of the handlebar 7 which is gripped, that is, which corresponds to the hand grip 8. The walls which define the seat 4 comprise threaded holes 9 for receiving screws 10 which clamp the structure of the master cylinder 1 to the handlebar and keep the plane X inclined at the above-mentioned angle.

In FIGS. 1 and 2, the reservoir 5 is formed integrally with the cylinder body 2 and contains the working fluid, as does the system as a whole, not shown. The reservoir is closed at the top by a cover 11 with an associated flexible diaphragm, not shown, to which the working fluid contained in the reservoir adheres. The fluid thus never comes into direct contact with the outside atmosphere. One of the walls of the reservoir 5 advantageously comprises a window 5a which enables the level of fluid in the reservoir to be checked from the exterior.

Inside the cylinder body 2 there is a chamber 12, connected to the reservoir 5 by means of ducts 13 through which the working fluid can pass from the reservoir 5 to the chamber 12. The chamber 12 also has a conventional delivery opening and a bleeding vent, the latter being indicated 14 in FIG. 2.

The chamber 12 has a cylindrical shape extending along an axis 15, also generally indicated as the axis of the cylinder. In the embodiment shown in FIG. 2 in particular, the axis 15 is disposed below the seat 4 for housing the handlebar 7, in the downward direction defined by the second vector V" of the vertical axis V. This means that, in the mounted condition, the axis 15 is disposed below the portion of the handlebar 7 to which the cylinder body 2 is clamped.

In the embodiment illustrated, the axis 15 is also arranged perpendicular to the axis of the portion of the handlebar 7 on which the cylinder body 2 is clamped and advantageously lies in a horizontal plane disposed entirely below the handlebar. The axis 15 and the plane X defined by the pivoting of the control lever 6 are advantageously arranged so as to intersect at a point B. The term "intersect" meaning that the axis 15 and the plane X have in common a single point, that is the point B, and that the axis 15 does not therefore lie in the plane X or in a plane parallel thereto.

In the embodiment shown in FIG. 2, the projection of the axis 15 onto the line of the plane X preferably meets the control lever 6 at an intermediate point between the fulcrum and the free end of the lever, so that the lever is a second-order lever.

The chamber 12 is advantageously positioned entirely below the seat 4, and hence below the handlebar 7, in the direction of the second vector V" of the axis V. The upper end of the reservoir 5 is correspondingly arranged slightly above the seat 4 and the space occupied by the reservoir occupies substantially the vertical dimension of the seat, and hence of the handlebar 7. In particular, the reservoir 5 is positioned in front of the seat 4, that is, in a position between the seat 4 and the control lever 6. Moreover, with respect to the position of the master cylinder 1 on the handlebar 7, and hence on the vehicle, the reservoir 5 is positioned in front of the seat 4, and hence in front of the handlebar 7, "in front" defining a position which, relative to the seat 4 and to the handlebar 7, is disposed in the direction of forward travel of the vehicle.

In accordance with the foregoing description, the cylinder body 2, together with the seat 4 and the reservoir 5, define a compact structure. In particular, in a cross-section such as that shown in FIG. 2, which is taken in a plane perpendicular to the plane X and containing the axis 15, the relative positions of the above-mentioned three elements are such that the projection of the seat 4 along a vertical axis V falls at least partially on the chamber 12 and the projection of the seat 4 along a horizontal axis P falls at least partially on the reservoir 5.

The chamber 12 houses a floating piston 16 which can move along the axis 15, forming a seal against the walls of the chamber. More particularly, the piston 16 can move between a travel-limit, rest position shown in FIG. 2 and an advanced, operative position, not shown. In the travel-limit, rest position, the piston 16 is urged by a return spring 17 into a position corresponding to the maximum distance from the handlebar whereas, in the advanced, operative position, the piston 16 overcomes the return spring 17 and the pressure of the fluid contained in the chamber 12 and in the system, and advances towards the handlebar.

This movement is brought about, by means of a rod 18, by the pivoting of the control lever 6. The rod 18 has a first portion 18a substantially inside the chamber 12 and interacting with the piston 16 and a second portion 18b which extends out of the chamber 12 and, in particular, towards the control lever 6. The two portions are defined substantially by a dust-protection cap 19 which seals the chamber 12 from the outside atmosphere.

The interaction between the first portion 18a and the piston 16 takes place by means of a connection 20 formed by the coupling between a seat formed at the end of the piston and a rounded end of the first portion 18a of the rod.

The second portion 18b terminates in a ball joint 21 for connection between the rod 18 and the control lever 6. In particular, the ball joint 21 is formed by a substantially spherical end of the second portion 18b which is coupled with a seat of matching shape formed in the body of the control lever 6. The ball joint 21 and, in particular, its centre C, meaning the centre of the substantially spherical end of the second portion 18b, is advantageously disposed below the point B when the piston 16 is in the travel-limit, rest position (FIG. 2). Moreover, the centre C of the ball joint 21 is advantageously disposed above the point B when the piston 16 is in the advanced, operative position. With regard to the datums indicated above, a position below the point B is a position which, relative to a horizontal plane extending through the point B, is disposed in the lower half-space defined by the direction of the second vector V''' of the axis V. Similarly, a position above the point B is a position which, with respect to a horizontal plane extending through the point B, is disposed in the upper half-space defined by the direction of the first vector V' of the axis V.

The way in which the master cylinder according to the present invention is used is described below with particular reference to a master cylinder for operating the braking system, although the following description is equally applicable to the clutch-operating cylinder.

When it is necessary to brake, the driver of the vehicle, whilst still gripping the hand grip 8, grips the control lever 6 and pivots it about its fulcrum, moving it towards the handlebar. The control lever 6 pivots in the plane X, interacting with the rod 18 and consequently with the piston 16.

In particular, the control lever 6 pushes the rod 18 in the region of the ball joint 21, causing it to slide in the plane X and hence along a path having both a horizontal component and a vertical component. The movement of the rod 18 pushes the piston 16 from the travel-limit, rest position to the advanced, operative position, overcoming the return spring 17 and the pressure of the working fluid, which gradually increases.

As a result of the pivoting of the control lever 6 which brings about the movement of the piston 16 between the travel-limit, rest position and the advanced, operative position, the ball joint 21 and, in particular, its centre C, moves substantially along the plane X between a first position slightly below the intersection point B and a second position slightly above the intersection point B. In an intermediate position of the pivoting of the control lever 6, the ball joint 21 is in a position in which the centre C preferably coincides with the point B and the rod 18 is correspondingly aligned with the axis 15 of the chamber 12. This coinciding arrangement occurs because the point B of the intersection of the axis 15 and the plane X lies on the path of the centre C of the ball joint 21, at an intermediate point thereof.

When the driver releases the control lever 6, the ball joint 21 returns to the position shown in FIG. 2 and the piston 16 is correspondingly urged back to the travel-limit, rest position by the return spring 17.

As can be appreciated from the foregoing description, the master cylinder according to the present invention satisfies the above-mentioned need to limit the space requirements owing to the presence of the cylinder body and of the reservoir and to solve the problems described with reference to the prior art.

In particular, the fact that the plane X of pivoting of the control lever 6 and the axis 15 of the chamber housing the piston intersect enables the chamber 12 to be positioned entirely below the handlebar, thus lowering the reservoir to the level of the handlebar, in front of the handlebar. The novel configuration adopted in fact enables the chamber housing the piston to be lowered, in comparison with conventional master cylinders, by an amount at least equal to the outside diameter of the portion of the cylinder body which surrounds the chamber, at the same time making the cylinder body more compact.

Excessive space requirements are thus avoided, particularly above the handlebar, enabling the cylinder to be incorporated in a motor vehicle more easily and improving both the aerodynamics and the aesthetics of the motor vehicle.

A further advantage of the master cylinder according to the present invention lies in the simplicity of its structure, enabling the problems mentioned with reference to the prior art to be solved without, however, altering the shape and functionality either of the vehicle as a whole, or of the respective brake/clutch systems in particular.

In addition to the foregoing advantages, the positioning of the rod 18 reduces wear of the piston. The fact that the centre C of the ball joint 21 moves from a position slightly below the point B to a position slightly above the point B in fact enables the two points preferably to coincide when the control lever, and correspondingly the rod 18 and the piston 16, are in an intermediate position of their travel. The coincidence of the two points in fact leads to an alignment between the rod 18 and the piston 16 in the intermediate position, which corresponds to the position which is reached most frequently during the life-cycle of a master cylinder and at which the forces in play are considerable.

The disalignment between the rod and the piston is in fact tolerated better in the initial stage of the pivoting of the control lever 6 since, at this stage it corresponds substantially to the taking-up of play during which the forces in play are limited. The disalignment between the rod and the piston is also better tolerated in the final stage of the pivoting of the control lever 6. In fact, although this stage corresponds to the stage at which the forces in play are greatest, it is reached with difficulty during normal use.

Naturally variants and/or additions may be provided for the embodiment described and illustrated above.

As an alternative to the arrangement shown in FIGS. 1 and 2, the plane X in which the control lever 6 pivots may not include the axis 7a of the handlebar 7 but nevertheless still intersects the axis 15 of the chamber for housing the piston 16.

Figure 3:
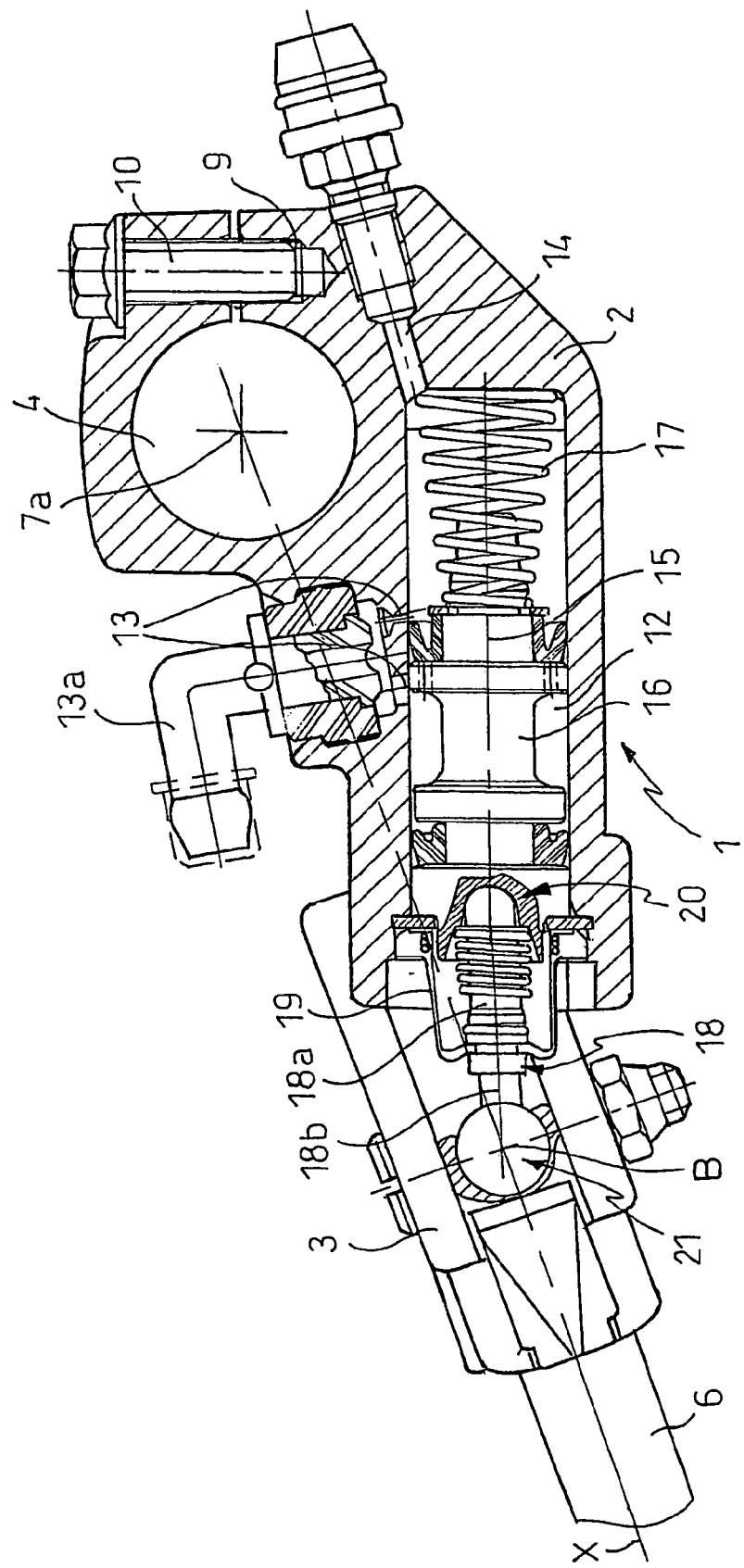
FIG. 3 shows a possible variant of the cylinder of FIG. 2.

The reservoir 5 may be formed separately from the portion of the cylinder body which houses the chamber 12 and which is nevertheless disposed in a lower position than in conventional cylinders by virtue of the smaller size and greater compactness offered by the cylinder according to the present invention. This possible solution is shown in FIG. 3 in which the separate reservoir, not shown, is connected to the chamber 12 by means of the ducts 13 and external pipes shown partially and indicated 13a.

As an alternative to the embodiments shown in the drawings, the axis 15 of the chamber 12 may be arranged in a plane which is not horizontal but nevertheless intersects the plane X. In this case, the angle α of intersection between the axis 15 and the plane X is preferably between 10° and 20°, "angle of intersection" defining the angle between the axis 15 and the line of the plane X lying in the plane perpendicular to the plane X and containing the axis 15.

Moreover, the path of the centre C of the ball joint 21 may not meet the point B. The point C consequently moves between a position slightly below the point B to a position slightly above the point B passing through an intermediate position which is at the same level as the point B but does not coincide therewith.

In a possible embodiment, not shown, the axis of the seat 4 may be other than the axis 7a of the end portion of the handlebar 7, that is, of the region of the hand grip 8.

As stated above, in the embodiment shown in the drawings, the axis 15 of the chamber 12 is disposed below the seat 4 so that the chamber is also entirely below the seat and the handlebar. According to an embodiment which is not shown, the axis 15 may still be below the seat 4 whilst the chamber 12 may be only partially below the seat 4.

In order to satisfy contingent and specific requirements, an expert in the art may apply to the above-described preferred embodiment of the master cylinder many modifications, adaptations and replacements of elements with other functionally equivalent elements without, however, departing from the scope of the following claims.

What is claimed is:

1. A master cylinder for vehicles controllable by handlebars, comprising:
   a cylinder body provided with a seat for housing a portion of the handlebar,
   a chamber for slidably housing a piston, the chamber extending along an axis inside the cylinder body, and
   a manual control lever which acts on the piston and is adapted to pivot about a fulcrum and within a plane,
   wherein the axis intersects the plane of pivoting of the control lever at a single point and wherein said axis along which said chamber for slidably housing the piston extends and said plane of pivoting of said control lever are inclined by an angle of between 10° and 20°.

2. A master cylinder according to claim 1 in which said axis is disposed in a horizontal plane.

3. A master cylinder according to claim 1 in which said axis is disposed below the seat for housing the handlebar.

4. A master cylinder according to claim 3 in which the chamber for slidably housing the piston is disposed at least partially below the seat for housing the handlebar.

5. A master cylinder according to claim 3 in which the chamber for slidably housing the piston is disposed entirely below the seat for housing the handlebar.

6. A master cylinder according to claim 1 in which the seat for housing a portion of the handlebar extends along an axis which lies in the plane of pivoting of the control lever.

7. A master cylinder according to claim 1 in which a reservoir containing a working fluid is provided and is disposed in front of the seat for the handlebar.

8. A master cylinder according to claim 7 in which the reservoir is formed integrally with the cylinder body.

9. A master cylinder according to claim 8 in which, in a section taken in a second plane perpendicular to the plane of pivoting and containing the axis, the chamber, the seat, and the reservoir have relative positions such that a projection of the seat along a vertical axis falls at least partially on the chamber and a projection of the seat along a horizontal axis falls at least partially on the reservoir.

10. A master cylinder according to claim 1 in which the control lever acts on the piston by means of a rod connected to the control lever by means of a ball joint defining a centre.

11. A master cylinder according to claim 10 in which the point of intersection between the axis and the plane lies on the path of the centre of the ball joint.

12. A master cylinder according to claim 11 in which the point of intersection between the axis and the plane lies at an intermediate point on the path of the centre of the ball joint.

13. A master cylinder according to claim 1 in which said axis is disposed in a horizontal plane.

14. A master cylinder according to claim 1 in which said axis is disposed below the seat for housing the handlebar.

15. A master cylinder according to claim 2 in which said axis is disposed below the seat for housing the handlebar.

16. A master cylinder according to claim 1 in which the seat for housing a portion of the handlebar extends along an axis which lies in the plane of pivoting of the control lever.

17. A master cylinder according to claim 2 in which the seat for housing a portion of the handlebar extends along an axis which lies in the plane of pivoting of the control lever.

18. A master cylinder according to claim 3 in which the seat for housing a portion of the handlebar extends along an axis which lies in the plane of pivoting of the control lever.

19. A master cylinder according to claim 1 in which the control lever acts on the piston by means of a rod connected to the control lever by means of a ball joint defining a centre.

20. A master cylinder according to claim 19 in which the point of intersection between the axis and the plane lies on the path of the centre of the ball joint.

21. A master cylinder according to claim 20 in which the point of intersection between the axis and the plane lies at an intermediate point on the path of the centre of the ball joint.

22. A master cylinder according to claim 2 in which the control lever acts on the piston by means of a rod connected to the control lever by means of a ball joint defining a centre.

23. A master cylinder according to claim 22 in which the point of intersection between the axis and the plane lies on the path of the centre of the ball joint.

24. A master cylinder according to claim 23 in which the point of intersection between the axis and the plane lies at an intermediate point on the path of the centre of the ball joint.

* * * * *